Oct. 19, 1954 W. S. WATSON 2,691,979

ANCHOR FOR UNILATERAL TRACTION

Filed June 13, 1951 8 Sheets-Sheet 1

INVENTOR

William S. Watson

BY [signature]

ATTORNEY

Oct. 19, 1954 W. S. WATSON 2,691,979

ANCHOR FOR UNILATERAL TRACTION

Filed June 13, 1951 8 Sheets-Sheet 2

INVENTOR
William S. Watson

BY [signature]
ATTORNEY

ANCHOR FOR UNILATERAL TRACTION

INVENTOR
William S. Watson
BY [signature]
ATTORNEY

Oct. 19, 1954 W. S. WATSON 2,691,979

ANCHOR FOR UNILATERAL TRACTION

Filed June 13, 1951 8 Sheets-Sheet 4

INVENTOR

William S. Watson

BY Edward P. Watson Jr.

ATTORNEY

ANCHOR FOR UNILATERAL TRACTION

Filed June 13, 1951 8 Sheets-Sheet 5

INVENTOR

William S. Watson

BY [signature]

ATTORNEY

INVENTOR
William S. Watson
BY [signature]
ATTORNEY

Oct. 19, 1954 W. S. WATSON 2,691,979

ANCHOR FOR UNILATERAL TRACTION

Filed June 13, 1951 8 Sheets-Sheet 7

INVENTOR

William S. Watson

BY [signature]

ATTORNEY

ANCHOR FOR UNILATERAL TRACTION

Filed June 13, 1951 8 Sheets-Sheet 8

INVENTOR
William S. Watson

BY [signature]
ATTORNEY

Patented Oct. 19, 1954

2,691,979

UNITED STATES PATENT OFFICE 2,691,979

ANCHOR FOR UNILATERAL TRACTION

William S. Watson, Bartlett, Ill.

Application June 13, 1951, Serial No. 231,338

15 Claims. (Cl. 128—84)

The present invention or discovery relates to an orthopedic accessory permitting the employment of only unilateral traction—as distinguished from bi-lateral traction including traction and counter-traction—in the reduction and fixation of bone fractures and dislocations and for other purposes as mentioned below.

Over the years change has been made in the technique of applying traction or pull to fractured bones in order to separate the fragmental ends of the fracture although considerable research has been devoted to this field. Heretofore traction has been accompanied by counter-traction in the same proportion in order to effect a reduction of the fractured bones, and no previous study has been made, of which the applicant is cognizant, to overcome the unnecessary pressure and tension caused by the application of counter-traction, which when combined with that of traction often results in serious complications to the patient such as edema, hemorrhage, gangrene, or loss of a limb or part to which counter-traction is applied. When a perineal post is employed with counter-traction, moreover, the structures in the soft tissues of the perineum between the perineal post and the osseous structure of the pubic arch, in both the male and female, are injured or permanently damaged if too severe traction and counter-traction are applied over a period of time and, further, urinary retention often results due to injury to the urethra.

Prior to the present invention, should a patient have a fracture of the tibia, femur or hip (including the trochanter, acetabulum and the innominate bone), it has been and, in many cases, is now the practice to apply traction to the injured limb—usually when the patient is in a supine or prone position—with the perineum bearing against a perineal post (of about five inches in height and from one to two inches in diameter) and to apply counter-traction to the other limb so that the surgeon may (by various methods) align the fractured ends or portions of the bone in position and into intimate contact or perform an ortho-plasty or a reconstruction of the hip using a Judet or other prosthesis. While manual traction and manipulation may be applied in some cases, mechanical traction and counter-traction are usual because the tension is unvarying and is not relinquished over a period of time as is the case when manual traction and counter-traction are applied; but, with either manual or mechanical traction and counter-traction, there often occurs a tilting or rotation of the pelvis about the perineal post due to unevenly applied traction and counter-traction or a slagging of one leg or the other and of the pelvis with resultant distortion of the fracture or fractures and loss of their reduction.

According to prior practices, should it require 50 pounds tension of pulp to apply sufficient traction for reducing a fracture in one leg or hip, 50 pounds of counter-traction should be applied to the other leg in order to hold the pelvis or innominate bone in proper position during the reduction with respect to the perineal post, but it is very difficult to obtain the same degree of traction and counter-traction—hence the tilting or rotation and distortion just mentioned. Furthermore, the cumulative effect of this application of traction and counter-traction creates at least 100 pounds' pressure of the perineum against the perineal post plus the leverage created by the pull of the fascia and muscle structure on the lateral parts of the innominate bones at or toward the ilium, this leverage being approximately from six to seven inches on each side from the pubic-symphysis. This pressure on the perineum and tension on the limbs have caused many of the complications above mentioned.

In view of the foregoing objections to the application of traction and counter-traction for the reduction of bone fractures, my invention is based on the recognition that counter-traction, in the sense of a pull or tension, is not necessary to the reduction of a fracture if one fragment of the fracture is anchored in position against unilateral traction applied only to the other fragment to reduce the fracture thereby greatly reducing the pressure and tension heretofore applied by the usual traction and counter-traction method and at the same time positioning the body of the patient more accurately and firmly.

I have found that by the employment of anchoring posts in the manner hereinafter described, one part of the body of a patient, carrying one fragment of the fractured bone, may be anchored by said posts to hold said part and its fragment substantially immovable against the traction applied to the other fragment of the fracture, thus eliminating need for counter-traction. Moreover, by distributing the pressure exerted by said applied traction between two or more of said posts, the pressure exerted on the soft tissue (particularly at the perineum) is still further reduced. Hence, if 50 pounds' traction or pull is necessary to reduce a fracture, the pressure against each post may be 25 pounds, and, if the posts are of a height and diameter to contact at least 5 square inches of the external tissue of the body, there is only 5 pounds per square inch pressure on the soft tissue of the body.

Consequently, it is an object of this invention to overcome the above enumerated and other faults or disadvantages of the prior practices pertaining to the application of traction and counter-traction for the reduction of bone fractures and to provide an orthopedic unilateral traction anchor, which may take the form of a sacral rest, applicable to all standard fracture tables, and which may be used in four positions, in either the horizontal or vertical plane, to provide abutments or anchors to resist traction applied to either the upper or lower extremities of a patient and thereby eliminate the necessity of or requirement for the application of counter-traction as is now practiced and to employ only traction. While the principle of this invention is shown and described in connection with a sacral rest, it is capable of being employed with traction applied to the thorax and upper extremities of the human body and the sacral rest itself may be used in this latter connection as will be apparent as this specification proceeds.

It is also an object of the present invention to provide an orthopedic accessory as above set forth which is very simple in construction and easy of adjustment to the individual patient and can be manipulated with celerity and ease by nurses or technical attendants.

Another object of the present invention is to provide an orthopedic accessory as above described so designed as to accommodate three X-ray translucent adjustable and quickly removable posts that provide the support or anchor to resist traction in the reduction and fixation of bone fractures.

A further object of the invention is to provide a traction anchor of the character above described which has an adjustable tray to support an X-ray cassette anterior-posterior of the patient and which is adjustable to at least three positions to enable the surgeon to offset the tray toward the injured part of the body to obtain a more accurate X-ray film or picture.

A still further object of this invention is the provision of an elevated sacral shelf, applicable to and from the traction anchor device of this invention, to allow the facile application of a plaster cast to the pelvic area after surgery.

The accompanying drawings illustrate by way of example an embodiment of the invention in the form of a sacral rest having the arrangement of parts and details of construction particularly described hereinafter, although it will be understood that said embodiment is for purposes of illustration only and is not to be taken as a definition of the limits of the invention, reference being had to the appended claims for this purpose. In said drawings, Figure 1 is a perspective view of an orthopedic surgical table of one known design but equipped with a sacral rest having the novel features of the present invention;

Figure 2:
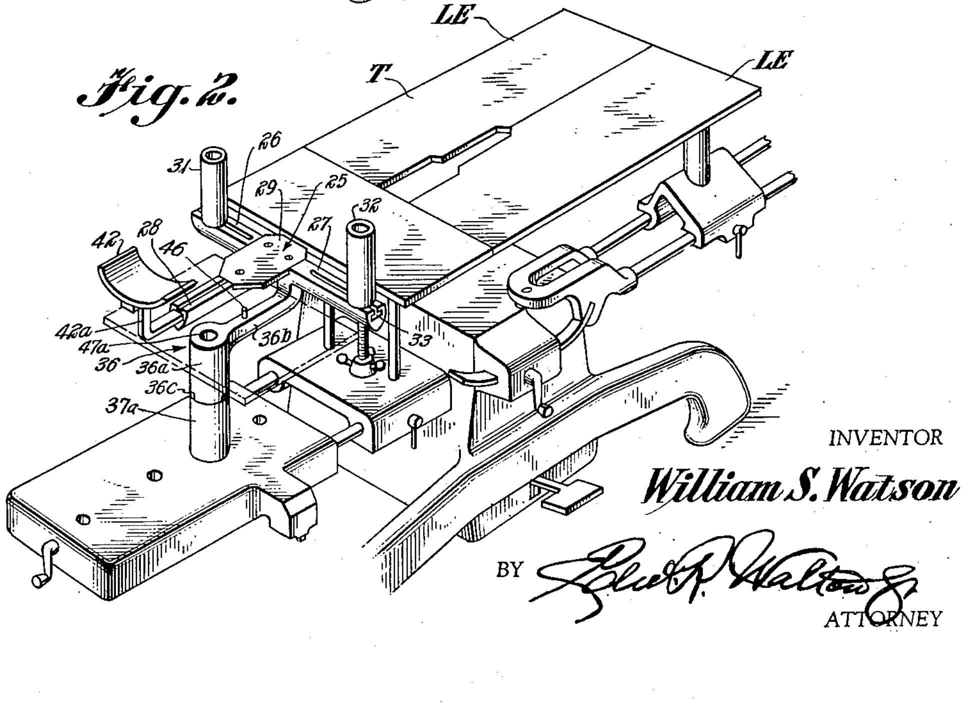
Figure 2 is a perspective view of the table shown in Figure 1 with its lumbar supporting section removed and the sacral rest positioned and equipped with an occipital support, when it is desired to apply traction to the arms (as shown in Figs. 15 and 20, or to the thorax section or neck as shown in Fig. 16), and with the leg supporting sections closed to provide a lumbar supporting area.
Figures 3, 4, 5, 6, 7:
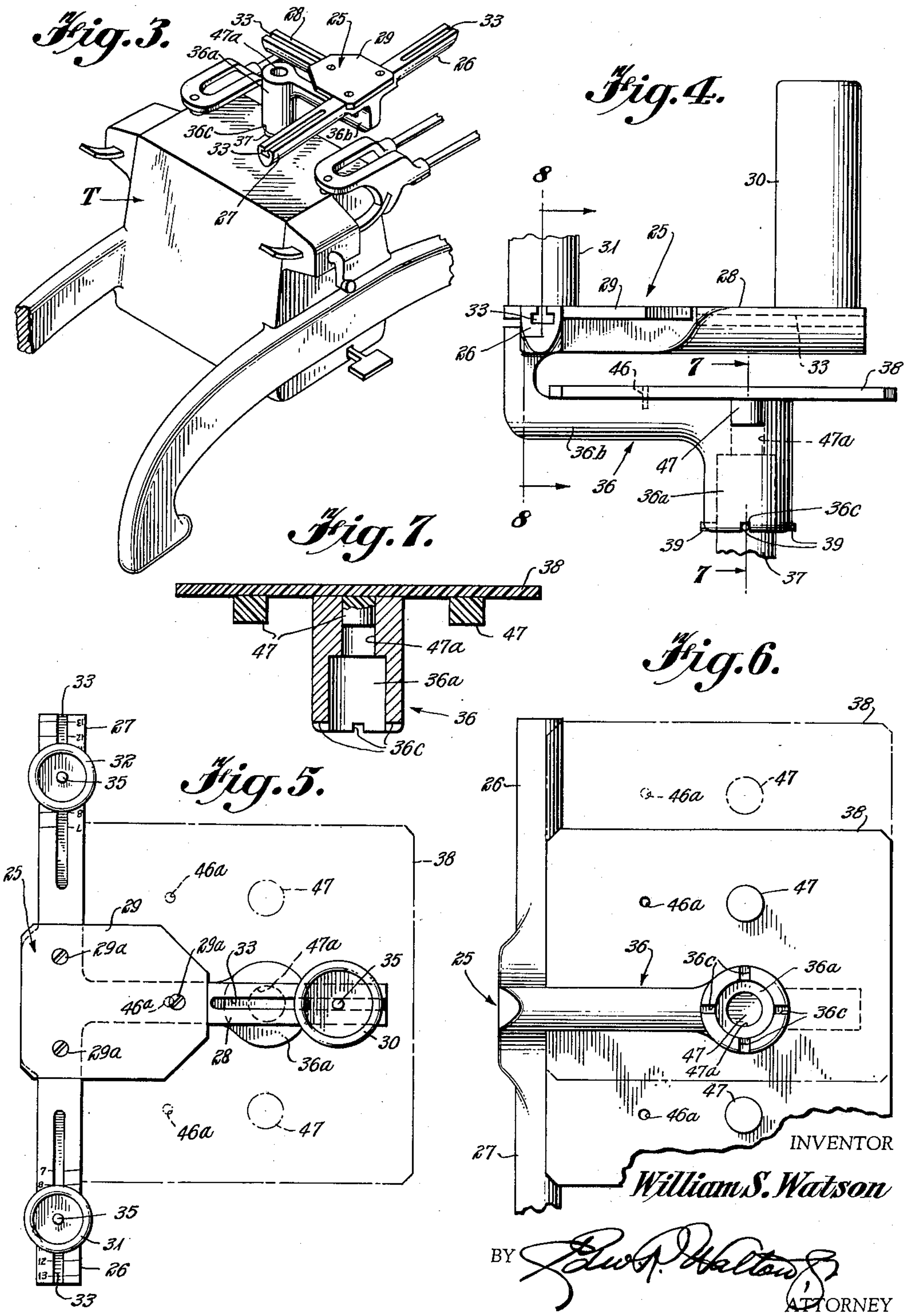
Figure 3 is a fragmentary perspective view of the table shown in Figs. 1 and 2 but with the sacral rest in a third position, when it is desired to apply traction to the arms (as indicated in Figs. 17 and 21)
Figure 4 is a side view of a sacral rest constructed in accordance with the present invention and equipped with the anchoring posts and with an adjustable supporting tray for a cassette.
Figure 5 is a plan view of the sacral rest shown in Fig. 4.
Figure 6 is an under or bottom view of the sacral rest shown in Figs. 4 and 5.
Figure 7 is a vertical sectional view of the sacral rest taken substantially on line 7—7 of Fig. 4.
Figures 11, 12:
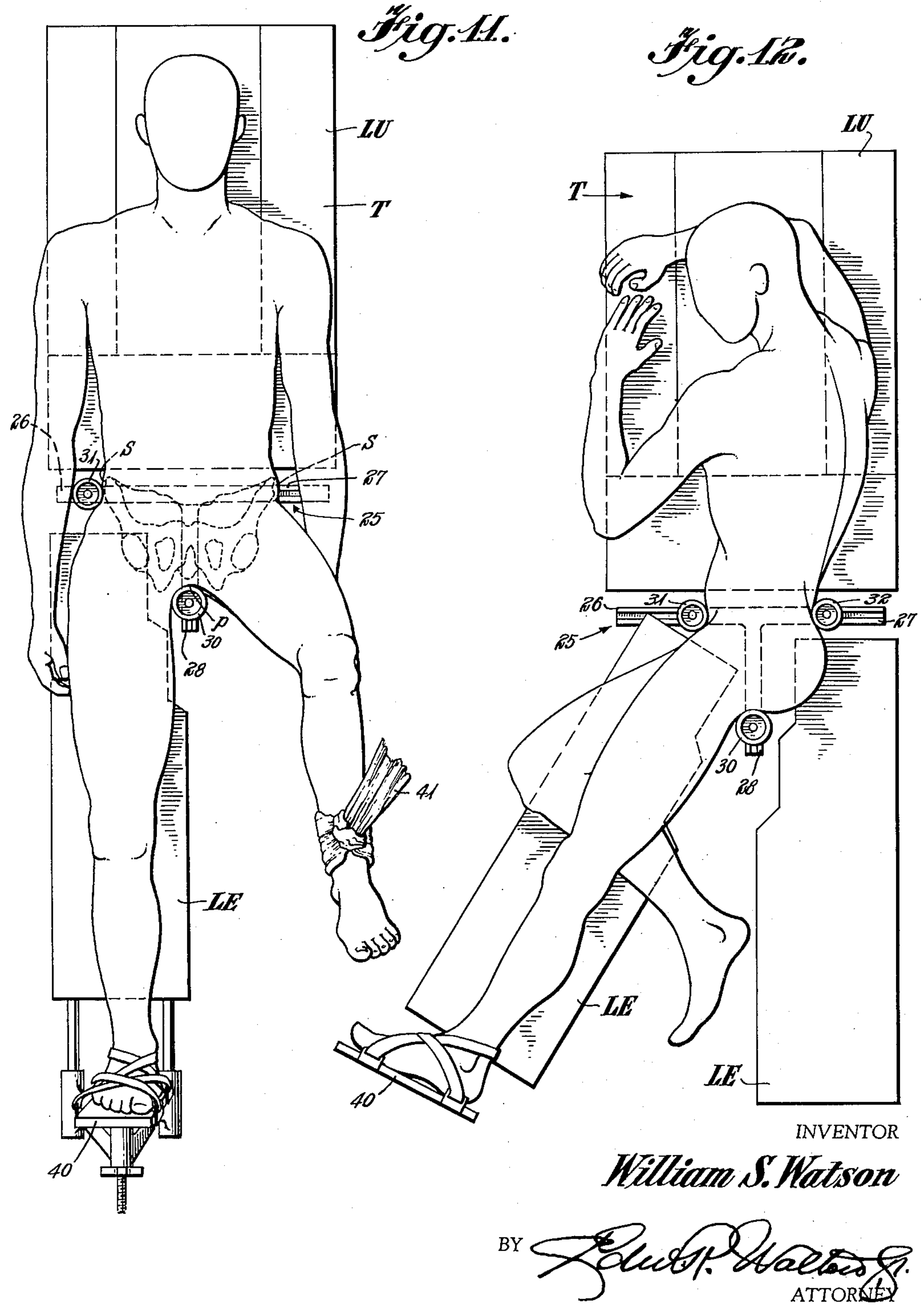
Figure 13:
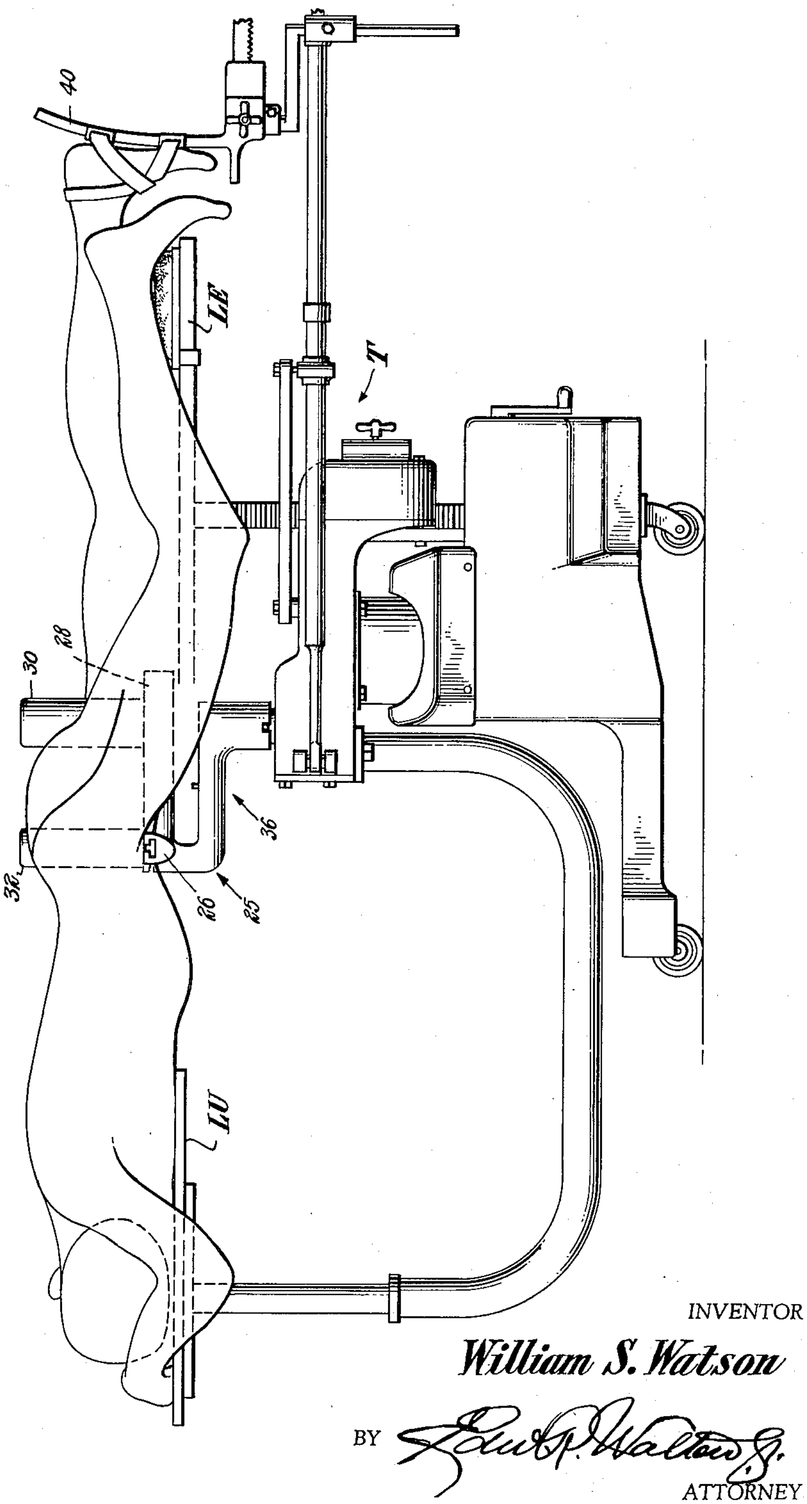
Figures 14, 15:
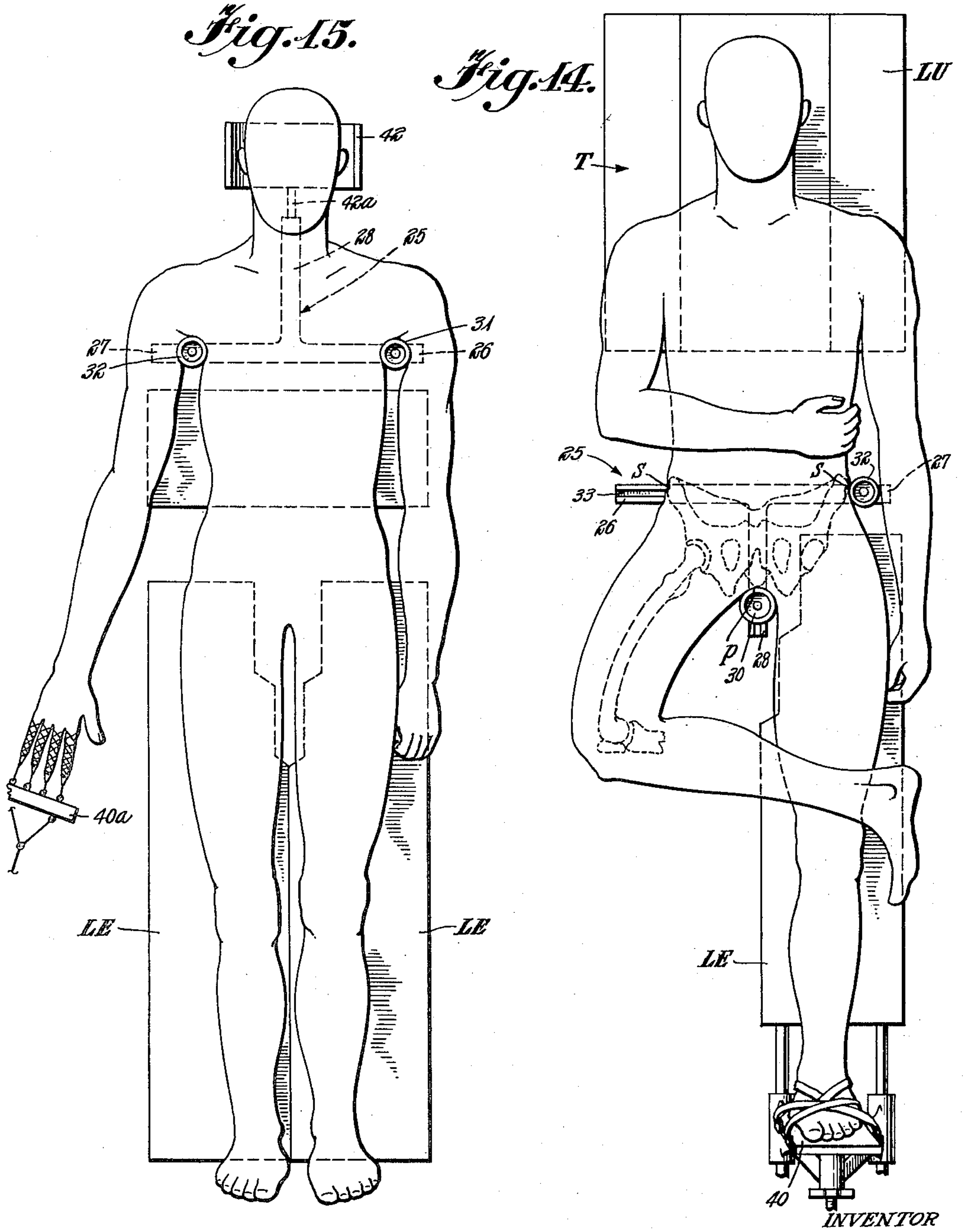
Figure 16:
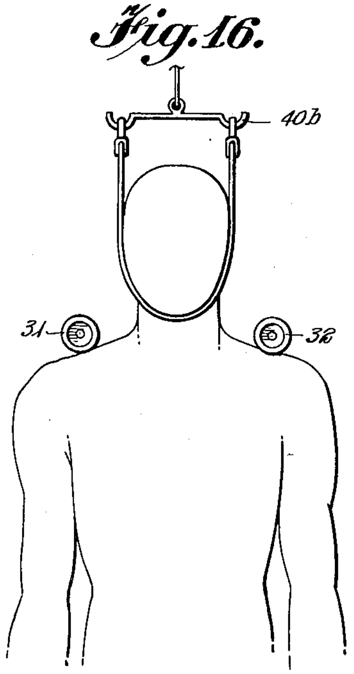
Figure 17:
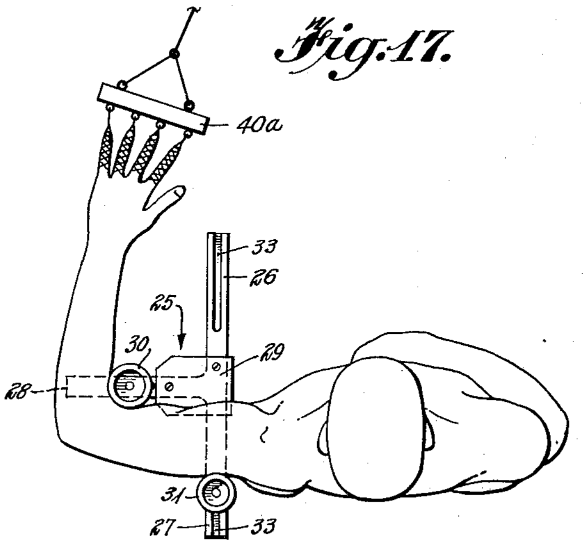
Figure 18:
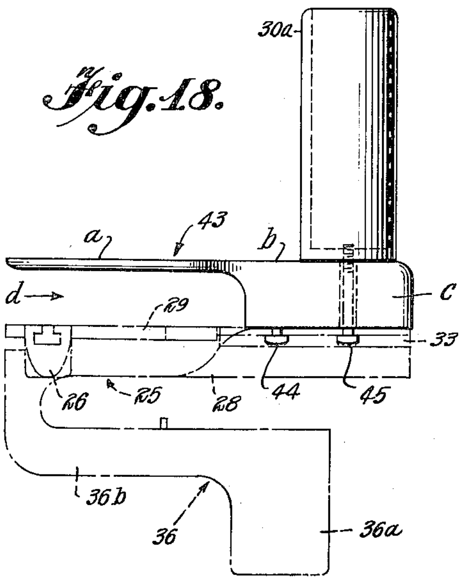
Figure 19:
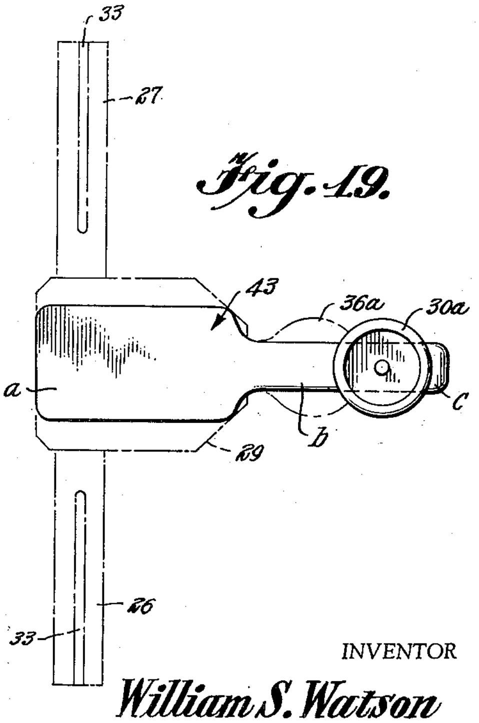
Figures 20, 21, 22, 23:
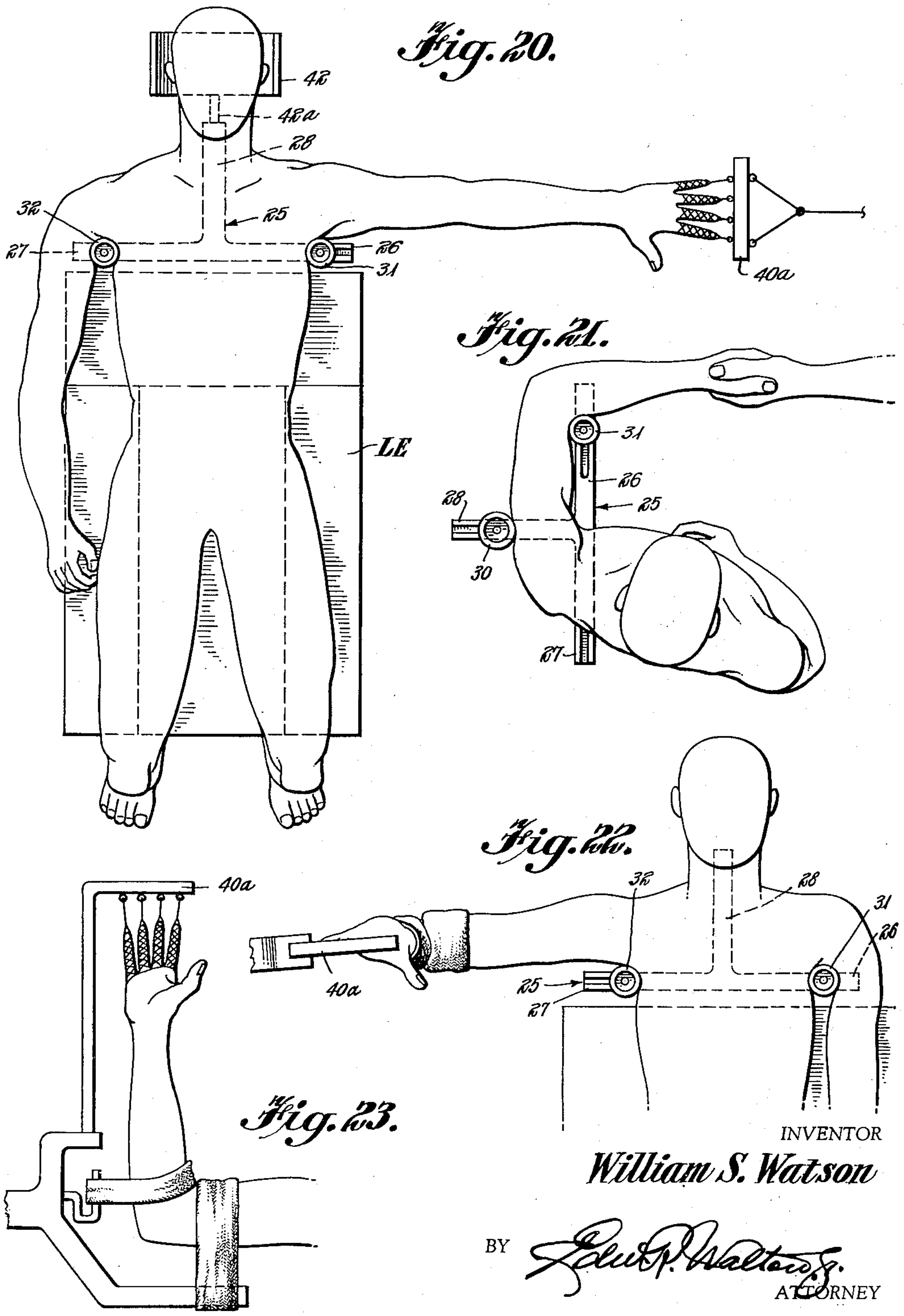

Figure 11 is a plan view of a surgical table equipped with the sacral rest of the present invention and illustrating the technique of applying unilateral traction to the right leg of the patient while the patient is in a supine position, there being no counter-traction applied to the left leg and the innominate bone being anchored between a perineal post and an ilium post positioned on the right side of the patient;

Figure 12 is a plan view of a table equipped with the sacral rest of the present invention and illustrating the manner of anchoring the innominate bone while the patient is lying on one side for an intramedullary pinning operation on the left side of the patient, the left leg of the patient being under traction and the right leg being free with no counter-traction applied;

Figure 13 is a side view of an orthopedic surgical table equipped with the improved sacral rest and illustrating the patient in prone position thereon for a Kocher's posterior approach to the acetabulum on the patient's left leg, the right leg of the patient being under traction and the innominate bone being anchored by one ilium post and the perineal post;

Figure 14 is a plan view of an orthopedic table equipped with the improved sacral rest with the patient in a supine position and with his right leg flexed across the left leg for an anterior approach to the acetabulum in which case no traction is only to the injured limb but applied to the well leg and the innominate bone is anchored by an ilium post on the patient's left side and the perineal post;

Figure 15 is a diagrammatic plan view of the table shown in Fig. 2 with the improved sacral rest equipped with an adjustable and removable occipital support and with two ilium posts adjusted under the arm pits to anchor the thorax while traction is being applied to the right arm of the patient in a distal direction;

Figure 16 shows the two ilium posts of the sacral rest as shown in Fig. 15 positioned to engage the tissues of the shoulders while traction is being applied to the head of the patient in a proximal direction for neck, spine or thorax reduction;

Figures 17 and 21 show the improved sacral rest employing two posts and positioned on a table in the manner illustrated in Fig. 3 for anchoring an arm of the patient while traction is being applied thereto in the manner illustrated; and, by reversing the position of the patient or the position of the sacral rest from that shown in Fig. 3, the right arm of the patient may be similarly manipulated;

Figure 18 shows the improved sacral rest equipped with an elevating shelf for raising the pelvis area above the sacral rest after an operation has been performed and when it is desired to apply a plaster cast around the area;

Figure 19 is a plan view of Figure 18;

Figure 20 is a view similar to Fig. 15 but showing traction applied to an arm in a transverse direction of the body while the thorax is anchored by two posts under the arm pits; and Figures 22 and 23 show a view similar to Fig. 20 but showing the traction applied to the arm in another direction.

Since the present invention has one of its greatest applications to the reduction of injuries of the lower extremities, including the innominate bone, it will often be incorporated in a sacral rest of an orthopedic surgical table and has been so illustrated; but said sacral rest or a similar device embodying the invention may be utilized in other connections for the reduction of fractures or dislocations of bones in the upper extremities as also illustrated and as will later appear. Consequently, the sacral rest is merely one example of the use of the anchoring posts of the present invention.

With specific reference to the drawings, the anchoring device embodying the invention is indicated generally at 25 and comprises oppositely extending lateral and aligned arms 26 and 27 from the juncture of which an intermediate and mesially positioned arm 28 extends at right angles to the arms 26 and 27. These arms are preferably nine or ten inches in length from their juncture so that the arms 26 and 27 will extend beyond the sides of a human body and anchor posts 30, 31 and 32 project vertically from and are adjustable along the arms 28, 26 and 27, respectively. At the juncture of said arms, is provided with a relatively small plate 29 affixed to the device by suitable means 29ª with its surface flush with the upper surfaces of said arms to form a rest to support the sacrum or other portion of the body.

Figures 8, 9, 10:
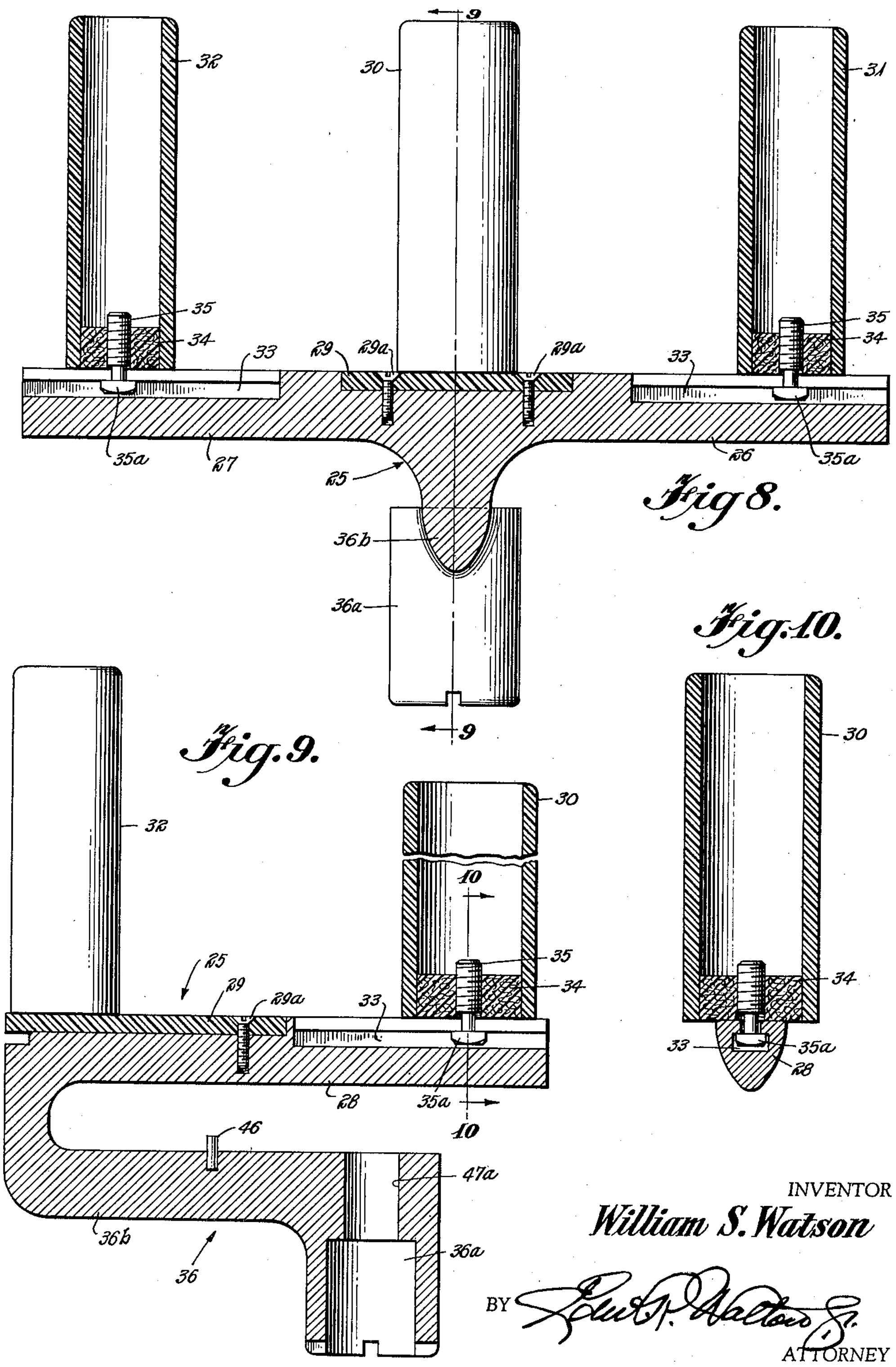
Figure 8 is a vertical sectional view taken substantially on line 8—8 of Fig. 4 but omitting the cassette supporting tray.
Figure 9 is a vertical sectional view of the sacral rest taken substantially on line 9—9 of Fig. 8.
Figure 10 is a detail view of the adjustable and removable anchor post and taken substantially on line 10—10 of Fig. 9.

In order that the adjustment of the posts 30, 31 and 32 may be made in a convenient and facile manner, as well as to permit easy removal of the same, each of the arms 26, 27 and 28 is provided in its upper surface with a slot 33 extending along its longitudinal center. This slot is, preferably, of an inverted T-shape in cross-section and opens through the free end of its arm. The posts 30, 31 and 32 are cylindrical and are of material translucent to X-rays and are, preferably, hollow to reduce bulk and weight. The low end of each of the posts is closed by a plug 34 in which is threaded a headed bolt 35, the head 35ª of the bolt being receivable in the head portion of the T-slot 33 with the intermediate shank of the bolt extending through the leg of the T-slot, as may be seen particularly in Figs. 8, 9 and 10. The base of each post rests firmly upon the flat upper surface of its respective arm and by rotating the posts about their axes, the bolts 35 may be tightened in their slots to firmly bind the posts in their adjusted positions or may be loosened to allow adjustment of the posts along the length of their arms or may be removed from their arms by sliding the bolt heads through the ends of the T-slots 33. The upper surfaces of the arms 26, 27 and 28 are also provided with scales of measurement so as to facilitate the accurate adjustment of the posts to a required position.

The device 25 carries on its underside a bracket 36 for attaching it to a suitable table or the like. In the present instance, the bracket 36 comprises a vertically disposed socket 36ª adapted to receive the upper end of a sacral rest supporting post 37 usually provided on orthopedic operating tables; and, extending laterally from this socket, is a bracket arm 36ᵇ underlying and spaced from the arm 28 of the device 25 and connected to the latter at the juncture of said arms 26, 27 and 28. It is preferred that the upper surface of the bracket arm 36ᵇ be flat and parallel with the upper surface of the arm 28 in order to provide a support or rest for a cassette tray 38 (see Figs. 4, 5, 6 and 7). The lower edge of the socket 36ª is provided with notches 36ᶜ to receive lugs 39 on the supporting post 37 so as to prevent the device 25 from rotating on the post 37.

The device 25 and its bracket 36 are preferably made of aluminum alloy and cast in one piece. In order that the sacral rest 29 and the arms 26, 27 and 28 may be flush with the top of orthopedic surgical tables of different designs or makes, adaptors are employed of the required design that may be interposed between the sacral rest supporting post 37 and the socket 36ª in order to adapt the sacral rest. These adaptors are not shown or described because they form no part of the present invention.

The anchor posts 30, 31 and 32 are about eight inches in length. The center post 30, which at times serves as and may be called the perineal post, is preferably not less than 2¾ inches in diameter and presents a wide bearing area against the perineum, while the end posts 31 and 32, which at times serves as and may be called the ilium or iliac posts, should not be less than 2¼ inches in diameter.

Figure 1:
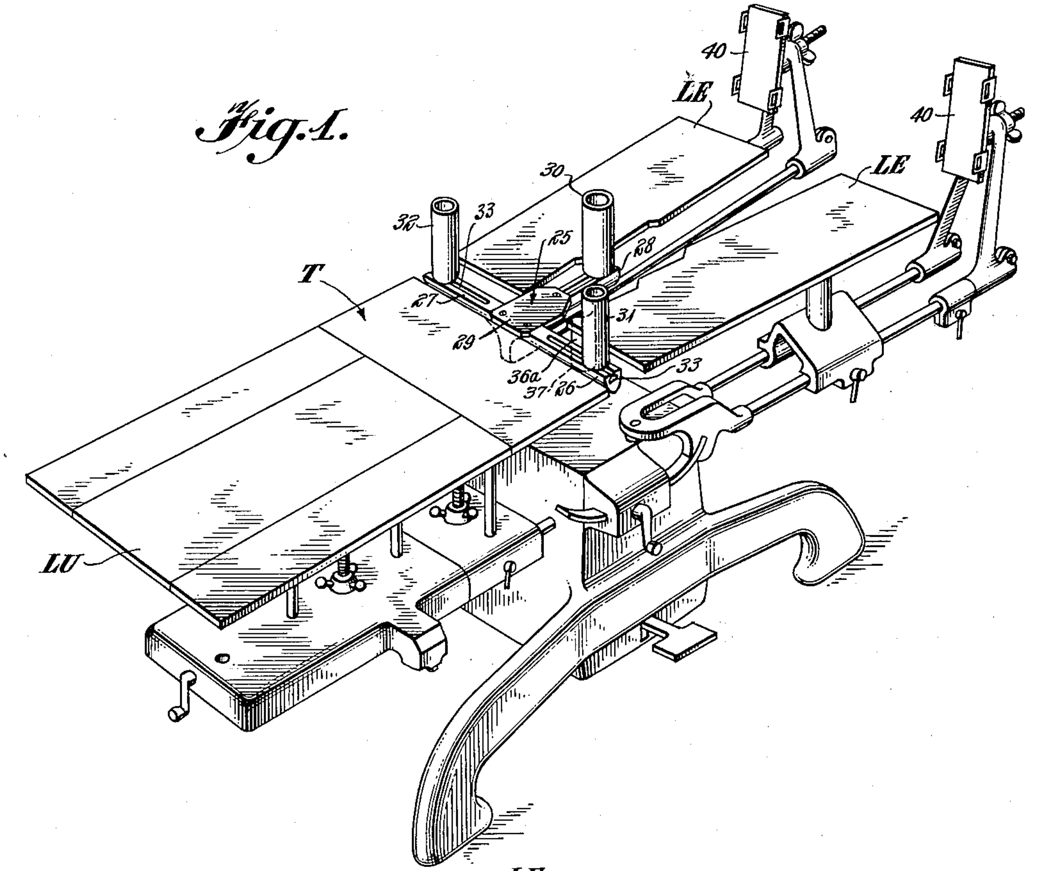

When the device of the present invention is utilized for unilateral traction technique of the lower extremity, the device is placed on an orthopedic surgical table, as shown in Fig. 1, to act as a sacral rest that anchors the pelvis or an innominate bone only against movement due to the application of traction applied to the limb of the patient connected with such anchored innominate bone. Since the ilium, pubis and ramii are not separate bones but are parts of the innominate bone, when the innominate bone on one side of the patient is so anchored, no stress or strain is applied to the symphysis of the pubis, sacro-iliac, sacral vertebra or opposite innominate bone or the pelvis. This result is accomplished by the employment of the perineal post 30 and an ilium post 31 or 32, as the case may require, and as illustrated in Figs. 11, 13 and 14, as examples. The patient may be placed on the table T in the positions illustrated, either in a supine or prone position, according to the type of operational technique to be employed in any given case, with the perineum *p* against the perineal post 30 and one of the iliac posts 31 or 32 in contact with the body opposite the anterior-superior spine *s* of the innominate bone on the side of the patient to which traction is to be applied.

To accomplish this positioning of the patient, the pelvis of the patient is centered on the table by bringing the crotch of the patient against the perineal post 30 which has been previously adjusted to an estimated position on its mesial arm 28 so that the anterior-superior iliac spines of the innominate bones of the pelvis are directly over the transverse bar 26—27. It may be necessary to move the patient up or down along the table to effect the positioning and to correspondingly adjust the perineal post 30; and, thereafter, an ilium post 31 or 32 is inserted in its slot 33 and adjusted to firmly rest against the external tissue of the body. In determining the position of the pelvis with respect to the iliac post 31 or 32, as the case may be, many surgeons may prefer to use "Bryant's line" to more accurately determine the location for this iliac post, "Bryant's line" being a plumb-line drawn from the anterior-superior iliac spine *s*. By having "Bryant's line" intersect the center of the T-slot 33 of the support arm 26 or 27, the proper point will be determined against which the iliac post, being employed, should bear. This location of contact for the iliac post, just mentioned, is selected to avoid major muscle and fascia to which the traction is applied, to assure adequate operating field for the surgeon, to refrain from crowding the lower extremity, to reduce to a minimum the leverage created by the applied traction, to use a site where the osseous structures are superficial and are architecturally constructed with sufficient bearing area to assure adequate supporting area for the pressure that may be created by the normal traction applied to the lower extremities.

After the iliac post 31 or 32 is so positioned with respect to the body of the patient and the perineum is firmly against the perineal post 30, traction is applied to the lower extremity—such as by strapping the foot of the patient to an extensionable or adjustable foot plate 40—and the resistance to this traction is given by the perineal post 30 and the iliac post 31 or 32 (contacting the crest *s* of the ilium) which distribute between them the pressure exerted by the applied traction. Thus, it will be seen that the pelvis and the innominate bone will be anchored in position by these posts and that because of the increased length and diameter (as suggested herein) of the perineal post 30 it will bear against the osseous structure lateral to the symphysis of the pubis and, also due to its large diameter, will engage a larger fleshy area of the perineum and reduce the pressure per square inch thereon. It will also be observed that no pressure or strain or stress is exerted upon the opposite innominate bone or upon the opposite limb which may be free or may be suspended (as at 41, Fig. 11) to hold it out of the way.

While Figs. 11, 13 and 14 show several different positions of the patient with respect to the anchor device of the present invention for unilateral traction on the lower extremity, it will be understood that there are many other positions or conditions under which this anchor device may be employed, for instance, as shown in Fig. 12, where the patient has been prepared on a surgical table for an intermedullary pinning operation of the left leg. In this latter case, the perineal post 30 is positioned against the lower buttocks and both iliac posts are employed, one anterior and the other posterior of the pelvis or innominate bones, to thus hold the pelvis immovable while traction is applied to the left leg in any of the usual accepted ways.

When the device of the present invention is utilized in connection with unilateral traction for the upper extremity, the lumbar supporting section LU of the operating table may be removed, as shown in Fig. 2, and the distal or leg supporting portion LE of the table may be manipulated to support the lumbar section of the patient. In the form of table herein shown, the sacral rest will be moved from its position shown in Fig. 1 and assembled on a supporting post 37ª usually provided on the table, or its equivalent, with the perineal post supporting arm 28 extending in the opposite direction than that shown in Fig. 1. The perineal post 30 is removed from its arm 28 and in its stead a bracket arm 42ª of an occipital support 42, of any suitable design, is inserted in the T-slot 33. The iliac posts 31 and 32 are inserted in their respective slots 33 of their arms 26 and 27. With the anchor device of this invention so assembled, the patient may be arranged upon the table and the posts 31 and 32 adjusted in the manners indicated in Figs. 15, 16, 20, 22 and 23 for the application of traction through suitable means 40ª to the upper extremities for the purposes well understood by those skilled in the art and without the necessity for the application of counter-traction as the thorax is anchored and held immovable against the applied traction. The position of the patient shown in Fig. 20 may be utilized for manipulating a dislocated shoulder, collar bone or the head of the humerus as well as for reducing fractures of the humerus, radius or ulna.

Also, by positioning the unilateral traction anchor device of this invention or an orthopedic surgical table, or other supporting means, in the manner shown in Fig. 3, a patient may sit beside the table and have traction applied in the manner illustrated in Figs. 17 and 21, without the necessity of counter-traction being applied as the humerus is anchored between two posts.

In some cases, where it is necessary to apply a plaster cast to the pelvic area of a patient following surgery, it is difficult to apply the bandages and plaster on that portion of the body resting on the table without unduly disturbing the patient. Consequently, there is also provided by this invention an elevating sacral shelf 43 removably applicable to the perineal-post supporting-arm 28 of the anchor device 25 and, when so applied, providing sufficient space for the application of the plaster cast. This shelf 43 comprises a relatively thin spade-like member *a* having an elongated reduced forward end *b* that is thickened, 2 or 3 inches in depth, to form a downwardly extending leg or boss *c* adapted to rest upon the flat upper surface of the arm 28 of the device 25. The underside of the boss *c* has headed bolts 44 and 45 receivable in the T-slot 33 of said arm 28. The bolt 45 is the same as bolts 35 and threads into the bottom end of a perineal post 30ª. Thus, when it is desired to apply a plaster cast to the pelvic area, the anchor posts 30, 31 and 32 are removed from the device 25, the mid-body portion of the patient slightly raised and the sacral-shelf 43 applied to the arm 28 of the device 25 by engaging the heads of bolts 44 and 45 in the slot 33 of said arm 28. If a perineal post 30ª is required to maintain the pelvis centered on the table, the post 30ª is moved against the perineum and rotated to tighten it in adjusted position—otherwise it is removed. The space *d* between the sacral shelf 43 and the anchor device 25 allows the application of the cast. When the cast has been applied, the post 30ª is rotated to loosen the bolt 45 in the slot 33 and the shelf 43 is slid along the arm 28 to move the bolt-heads from said slot, this movement also sliding the spade-like portion *a* from between the skin of the patient and the cast.

Another feature of the present invention resides in the provision of a cassette tray 38 supported on the arm $36^b$ of the supporting bracket 36 of the anchor device 25 so as to underlie the plate 29 and arm 28 and adjustable to three positions transversely of the bracket of the support 25. This adjustment may be accomplished by providing an upstanding pin 46 on the upper surface of the horizontal arm $36^b$ which is fittedly receivable in three spaced complemental openings $46^a$ in the underside of the cassette tray 38 which openings are transversely arranged with respect to said tray, the center opening being adapted to position the tray centrally of the device 25, when engaged with the pin 46, and the other two end openings being adapted to position the tray in offset positions to the right or left of its center position as may be required to bring the cassette supported thereby directly under the portion of the body to be X-rayed. Also, in order to assure stability of the tray in its adjusted positions, the socket $36^a$ is formed at its upper end with an opening $47^a$ which will fittedly receive a complemental projection 47 on the lower or underside of the tray 38, there being three of these projections 47 corresponding to the openings $46^a$ in the plate and each aligned with one of said openings $46^a$ respectively.

The unilateral traction anchor of the present invention together with the adjustable cassette tray has many advantages when using X-ray and among them are the following—

1. The pelvis is fixed and, therefore, the center of the object, which would be the center of the ray, is constant;

2. In lateral X-raying of the neck of the femur, the rays are directed directly through the perineal and iliac posts which are relatively X-ray translucent;

3. The injured limb being the only extremity in traction, the well leg may be put in any desired position for taking X-rays;

4. The supporting post (37, $37^a$ or the like) by which the traction anchor is attached to the table is offset to prevent any obstruction in taking X-rays of both hips;

5. In using this counter-traction unit for the upper extremities, a complete anterior-posterior view of the shoulder may be taken with the cassette resting on the anterior-posterior cassette holder and the lateral view may be taken of the head and neck of the humerus, directing the ray directly through the upright post which is placed at the axilla while the cassette rests parallel with the shoulder.

From the above it is manifest that the unilateral traction anchor device of this invention eliminates the necessity for counter-traction and holds the anchored part in a fixed or immovable position when traction is applied to the other fragment part of a fracture, and thus eliminates the tension and pressures, strains and stresses attendant upon the application of counter-traction; that, when the traction and reduction is attained, they remain fixed and constant with the use of this device; and that, by anchoring one fragmented part of a fracture between two anchor posts, as above described, only the tension of the traction necessary for reducing the fracture is applied to the patient and this is distributed between the two abutments or anchor posts—thus overcoming the injurious effects and complications that often result from the application of both traction and counter-traction for the reduction of fractures. It is also manifest that the above described technique of applying only unilateral traction for the reduction of fractures is accomplished by a very simple and quickly adjustable and manipulatable device.

Having thus described the invention and the manner in which the same is to be used, it is to be understood that the invention is not to be limited to the exact details of arrangement and construction herein shown and described as the same may be varied within the scope of the appended claims.

That which is claimed, as new, is:

1. The combination with a table which includes a sacral rest, of a unilateral traction anchor device mounted on said rest and comprising a horizontal arm extending laterally from each side of said rest, a horizontal arm mesially positioned and extending from the distal end of said rest, posts detachably mounted on said arms in upstanding position and extending above said rest to contact portions of a human body lying between them, and releasable means securing said posts in selected positions along the length of said arms whereby orthopedic surgery and/or manipulations may be performed under traction on injured osseous structures of one extremity of the body without counter-pull or traction on another extremity thereof.

2. In combination with a surgical fracture table having a surface to support the body of a patient in a lying position thereon, a unilateral traction anchor device for the body of said patient, said device comprising two rigid iliac posts removably mounted on said table in oppositely transversely aligned position on opposite sides of the mesial line of said surface and substantially normal to and above said surface, and a rigid post removably mounted on said table at a point offset from said iliac posts distally and mesially of said surface and substantially normal to and above said surface and adapted to be brought into bearing engagement with the area of the perineum of the patient, whereby one innominate bone of the pelvis may be anchored against movement, when traction is applied only to the leg connected with said one innominate bone and without stress or strain on the symphysis of the pubis, sacro-iliac, sacral vertebra or the opposite innominate bone, by causing said perineal post to bear against the osseous structure of said anchored innominate bone lateral to the symphysis of the pubis and one of said iliac posts to bear against the anterior-superior spines of the ilium of said anchored innominate bone.

3. In combination with a surgical fracture table having a surface to support the body of a patient in a lying position thereon, a unilateral traction anchor device for the body of said patient, said device comprising post-mounting means on said table, two of said mounting means being disposed in transverse alignment on opposite sides of the mesial line of said surface and another such means being disposed mesially of said surface and spaced distally of said other two mounting means, posts mounted on and extending from said mounting means substantially normal to and above said surface and adapted to bear against the body of the patient at the anterior-superior spines of the ilium and with the area of the perineum of the patient, each of said posts being adjustable along its mounting means toward and from the point of intersection of the mesial line of said surface with said transverse alignment of said first two mounting means.

4. In apparatus of the class described, the combination of a sacral rest, arms extending from said rest one mesially from its distal end and one laterally on each side of the mesial plane, an inverted T-slot extending longitudinally along the upper surface of each arm to its free end, rigid posts mounted on said arms and extending above said rest, headed connectors slidably and non-rotatably engaged in said slots and insertable therein through the open free ends thereof, each post having a threaded bore receiving one of said connectors whereby said posts may be clamped in adjusted positions along said arms by rotation of the posts relative to their connectors.

5. An orthopedic device for anchoring a portion of the human body thereon comprising a bar having a length greater than the width of an adult person, a bar extending medially from said first bar at substantially a right angle thereto, and in substantially the same horizontal plane, at least two rigid posts having a length to project substantially above and normal to the plane of the upper surfaces of said bars for engagement with a portion of a human body located therebetween, cooperating anchoring means on said bars and posts fixedly securing said posts in desired adjusted positions along the length of said bars, and device-supporting means connected to said bars.

6. An orthopedic device as set forth in claim 5 wherein the said supporting means comprises a bracket arm substantially parallel with and underlying said second bar in spaced relation therewith to provide a support for a cassette tray, said bracket arm having its end adjacent said first bar connected with the latter, a cassette tray supported on the surface of the bracket arm underlying said second bar, said tray being shiftable planarly and laterally of said bracket arm to either side of the latter, and inter-engaging means between the bracket arm and the tray holding and positioning said tray in its several shifted positions, thereby permitting lateral adjustment of the tray relative to the device to bring the cassette in proper position with respect to the point of the body of the patient being X-rayed.

7. An orthopedic devices as set forth in claim 5 wherein the said supporting means comprises a bracket arm substantially parallel with and underlying said second bar in spaced relation therewith to provide a support for a cassette tray, said bracket arm having its end adjacent said first bar connected with the latter, the surface of the bracket arm opposite said second bar having a pin projecting therefrom and a socket opening therein spaced from said pin, a cassette tray removably supported on said bracket arm and having spaced and transversely aligned depressions in its underside to selectively and fittedly receive said pin and, further, having spaced and transversely aligned projections on its underside to selectively and fittedly extend into said socket opening whereby the cassette tray may be held in centered or offset positions relative to said accessory.

8. In a sacral rest, a bracket arm underlying said rest and extending in a direction along the mesial plane of said rest and spaced therefrom, one end of said arm being connected to said rest at its proximal end, a table attaching member at the other end of said arm, the surface of said arm opposite said sacral rest having a pin projecting therefrom and a socket opening therein spaced from said pin, a cassette tray removably supported on said bracket arm and having spaced and transversely aligned impressions in its underside to selectively and fittedly receive said pin and, further, having spaced and transversely aligned projections on its underside to selectively and fittedly extend into said socket opening, whereby the casette tray may be held in centered or off-set positions relative to said accessory.

9. An orthopedic device for supporting and anchoring a portion of the body of a patient against a displacing force comprising a bar having an arm extending medially therefrom, at least two posts mounted on said bar and arm and of a length to project substantially above and normal to the plane of the upper surfaces of said bar and arm for engagement with a portion of a human body located therebetween, a slot extending longitudinally along each of said bar and arm from the free end portions thereof, connectors each having a head slidably and non-rotatably engaged in one of said slots, each post mounted on one of said connectors, cooperating means on each post and its connector whereby relative rotation therebetween causes relative axial displacement thereof, whereby said posts may be clamped in adjusted positions along the length of said bar and arm, and a device-supporting bracket connected at one end to said bar and underlying said arm in spaced relation thereto.

10. A sacral rest having laterally extending arms projecting from opposite sides of said rest at the proximal end thereof, an arm projecting from the distal end of said rest and disposed substantially in the mesial plane of said rest, at least two rigid posts adjustable longitudinally along said arms and extending therefrom substantially normal to and above said rest for engagement with the ilium and the perineum of a patient located therebetween, and releasable means securing said posts in adjusted positions on said arms.

11. A sacral rest having laterally extending arms projecting from opposite sides of said rest at the proximal end thereof, an arm projecting from the distal end of said rest and disposed substantially in the mesial plane of said rest, at least two rigid posts mounted on said arms for adjustment longitudinally thereof and extending therefrom substantially normal to and above said rest for engagement with the ilium and the perineum of a patient located therebetween, said posts and arms having cooperating means securing said posts in adjusted positions on said arms, and a sacral shelf having a supporting leg engaging said mesial arm for supporting said shelf above said rest in spaced relation, said leg being disposed with respect to said shelf and rest so as to provide an unobstructed space between said shelf and rest to permit the application of a plaster cast to the pelvic area of a patient, and cooperating means on said leg and mesial arm securing said shelf in adjusted position on said arm.

12. Anchoring means for anchoring the pelvis of a human body against movement as a result of a displacing force applied thereto, said anchoring means including a patient support having an approximately horizontal surface, a perineal post, and an iliac post, each of said posts rising to a substantial body-engaging height above said supporting surface and each having a rigid body-engaging portion substantially in the form of a portion of a cylinder circular in horizontal cross section and with its axis substantially vertical, the axes of the two posts being substantially parallel to each other, and means mounting the two posts for horizontal adjustment relative to each other to such positions that when the perineal post engages the perineal region of the pelvis of the patient, the iliac post may be positioned to engage the external body tissue of the patient immediately opposite the anterior-superior spine of one of the innominate bones of the patient, said posts providing rigid abutments engaging the pelvis and resisting displacement thereof.

13. Anchoring means for anchoring the pelvis of a human body against movement as a result of the displacing force of unilateral traction applied to one leg, said anchoring means including a patient support having an approximately horizontal surface, a perineal post and an iliac post, each of said posts being firmly mounted at its lower end at approximately the elevation of said supporting surface and extending therefrom upwardly to a substantial body-engaging height above said supporting surface, each of said posts being substantially in the form of a rigid cylinder circular in horizontal cross section and of uniform diameter throughout the effective body-engaging portion of its height, the axes of both posts being substantially vertical and parallel to each other, an adjustable mounting for the lower ends of both posts so said posts may be moved horizontally relative to each other to such positions that when the perineal post engages the perineal region of the pelvis of a patient to hold the pelvis against longitudinal movement toward the feet of the patient, the iliac post may be positioned to engage the external body tissue of the patient immediately adjacent the anterior-superior spine of the innominate bone of the patient on the side where traction is applied, to hold the pelvis against rotary movement about the perineal post as a center, as a result of the traction applied to the patient's leg, and means anchoring said posts fixedly in adjustable positions.

14. A construction as defined in claim 12, in which both of said posts are hollow cylinders of substantially the same external diameter and wall thickness and height, and are of material translucent to X-rays, so that when an X-ray picture is taken along a line intersecting the axes of both posts and is recorded on a film arranged substantially perpendicular to said line, the shadows of the two posts as recorded on the film will constitute reference points in the picture enabling the determination of the orientation of the line along which the picture is taken, and the shadow of the side walls of the post closer to the film will appear smaller than and within the outline of the shadow of the side walls of the post farther from the film if the line of taking the picture is accurately aligned to intersect the axes of both posts.

15. Anchoring means for anchoring the pelvis of a human body against movement as a result of a displacing force applied thereto, said anchoring means including a patient support having an approximately horizontal surface, a perineal post and an iliac post, both of said posts being firmly supported at their lower ends and adjustably mounted for horizontal movement relative to each other to bring the perineal post into position to engage the perineal region of a patient and the iliac post into position to engage the patient in the region of the anterior-superior spine of the innominate bone on the side where traction is to be applied, both posts having patient-engaging surfaces which are curved convexly toward the patient in a horizontal direction and which are straight in a vertical direction so that the position of the engaged part of the patient's body does not vary in a horizontal direction regardless of vertical movements of the engaged part of the body up or down the length of the post, and means anchoring said posts fixedly in adjusted positions.

References Cited in the file of this patent

UNITED STATES PATENTS

| Number | Name | Date |
|---|---|---|
| 824,612 | Bartlett | June 26, 1906 |
| 1,160,451 | Sanford | Nov. 16, 1915 |
| 2,200,541 | Chick | May 14, 1940 |
| 2,266,296 | Anderson | Dec. 16, 1941 |
| 2,477,562 | Anderson | Aug. 2, 1949 |
| 2,565,019 | Buchanan | Aug. 21, 1951 |

OTHER REFERENCES

The Journal of Bone and Joint Surgery for April 1951, advertising page 12. Copy in Scientific Library.